US012553040B2

(12) United States Patent
Han et al.

(10) Patent No.: US 12,553,040 B2
(45) Date of Patent: Feb. 17, 2026

(54) CARBONIC ANHYDRASE COMPLEX AND METHOD FOR BIOIMMOBILIZING CARBON DIOXIDE AND ENHANCING LIPID PRODUCTION THEREBY

(71) Applicant: KOREA UNIVERSITY RESEARCH AND BUSINESS FOUNDATION, Seoul (KR)

(72) Inventors: Sung Ok Han, Seoul (KR); Seung-Kyou You, Jeonju-si (KR); Hyun-Min Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 459 days.

(21) Appl. No.: 18/014,675

(22) PCT Filed: Aug. 12, 2021

(86) PCT No.: PCT/KR2021/010733
§ 371 (c)(1),
(2) Date: Jan. 5, 2023

(87) PCT Pub. No.: WO2022/035255
PCT Pub. Date: Feb. 17, 2022

(65) Prior Publication Data

US 2024/0076644 A1 Mar. 7, 2024

(30) Foreign Application Priority Data

Aug. 12, 2020 (KR) ........................ 10-2020-0101363
Jul. 19, 2021 (KR) ........................ 10-2021-0094366

(51) Int. Cl.
*C12N 9/88* (2006.01)
*C07K 14/195* (2006.01)
*C12N 1/12* (2006.01)
*C12P 7/64* (2022.01)

(52) U.S. Cl.
CPC .............. *C12N 9/88* (2013.01); *C07K 14/195* (2013.01); *C12N 1/12* (2013.01); *C12P 7/64* (2013.01); *C12Y 402/01001* (2013.01)

(58) Field of Classification Search
CPC ............ C12N 9/88; C12P 7/64; C07K 14/195
See application file for complete search history.

(56) References Cited

U.S. PATENT DOCUMENTS

2019/0203222 A1 7/2019 Sayre et al.
2024/0076644 A1* 3/2024 Han .......................... C12P 7/64

FOREIGN PATENT DOCUMENTS

CN 106995817 A 8/2017
KR 10-2013-0128048 A 11/2013

OTHER PUBLICATIONS

Mei Li, et al., "Site-specific and high-loading immobilization of proteins by using cohesion-dockerin and CBM-cellulose interactions", Bioconjugate Chemistry, Jun. 29, 2016, pp. 1-6.
Li-Hai Fan, et al., "Cell surface display of carbonic anhydrase on *Escherichia coli* using ice nucleation protein for $CO_2$ sequestration", Biotechnology and Bioengineering, Jul. 5, 2011, p. 1, vol. 108, Issue 12.
Seung Kyou You, et al., "Enhanced $CO_2$ fixation and lipid production of *Chlorella vulgaris* through the carbonic anhydrase complex", Bioresource Technology, Dec. 2020, pp. 1-8, vol. 318.
Dae Hee Kang, et al., "Synergistic effect of the enzyme complexes comprising agarose, carrageenase and neoagarobiose hydrolase on degradation of the red algae", Bioresource Technology, Feb. 2018, pp. 666-672, vol. 250.
Xiaojing Liu, et al., "High-Resolution Metabolomics with Acyl-CoA Profiling Reveals Widespread Remodeling in Response to Diet", Molecular & Cellular Proteomics, 2015, pp. 1489-1500, vol. 14, No. 6.
Seung Kyou You, et al., "Enhancing Fatty Acid Production of *Saccharomyces cerevisiae* as an Animal Feed Supplement", J. Agric Food Chem, 2017, pp. 11029-11035, vol. 65, No. 50.
International Search Report for PCT/KR2021/010733 dated Dec. 6, 2021 [PCT/ISA/210].

* cited by examiner

*Primary Examiner* — Tekchand Saidha
(74) *Attorney, Agent, or Firm* — Sughrue Mion, PLLC

(57) ABSTRACT

The present disclosure relates to a carbonic anhydrase complex and a method for preparing same, in which a conjugate of a carbonic anhydrase and a dockerin module is bound to a small cellulose binding protein including a cohesin module and a cellulose binding module (CBM) and method of manufacturing thereof. The complex, which includes a cellulose binding module, is immobilized on the surface of green algae, to increase access to a substrate and enzyme activity, thereby efficiently fixing carbon dioxide, and increasing the growth and lipid production of green algae without adding other carbon sources. The present disclosure is expected to be actively utilized in fields, such as biofuels, using carbon dioxide fixation.

9 Claims, 5 Drawing Sheets

Specification includes a Sequence Listing.

(A)

(B)

CARBONIC ANHYDRASE COMPLEX AND METHOD FOR BIOIMMOBILIZING CARBON DIOXIDE AND ENHANCING LIPID PRODUCTION THEREBY

CROSS REFERENCE TO RELATED APPLICATIONS

This application is a National Stage of Application No. PCT/KR2021/010733 filed Aug. 12, 2021, claiming priority based on Korean Patent Application No. 10-2020-0101363 filed Aug. 12, 2020 and Korean Patent Application No. 10-2021-0094366 filed Jul. 19, 2021, the entire disclosures of which are incorporated herein by reference.

INCORPORATION BY REFERENCE OF SEQUENCE LISTING

The instant application contains a Sequence Listing which has been filed electronically in txt format and is hereby incorporated by reference in its entirety. Said txt copy, created on Sep. 18, 2023, is named Q282987_sequence listing as filed.txt and is 5,028 bytes in size.

TECHNICAL FIELD

The present disclosure relates to a carbonic anhydrase complex and the like, and more particularly, a carbonic anhydrase complex in which a conjugate of a carbonic anhydrase and a dockerin module is bound to a small cellulose binding protein including a cohesin module and a cellulose binding module (CBM) and method of manufacturing thereof.

BACKGROUND ART

Petroleum is a limited non-renewable energy resource, and the need for renewable energy resources is being emphasized due to related environmental problems thereto. The combustion of fossil fuels produces carbon dioxide ($CO_2$) and carbon monoxide (CO), nitric oxide (NO), and sulfur oxide (SOx) as by-products. Carbon dioxide is a major greenhouse gas and is considered as a major cause of global warming. Research on chemical and biological approaches to reduce atmospheric $CO_2$ is increasing. Biological $CO_2$ is mainly captured by converting organic compounds into $CO_2$ through photosynthesis by terrestrial plants or microalgae. Biological fixation of $CO_2$ by microalgae has many advantages including rapid growth, high photosynthetic efficiency, and $CO_2$ fixation regulation ability compared to fixation by terrestrial plants.

*Chlorella vulgaris* is green algae that use $CO_2$ through photosynthesis, and are the most abundant and widely studied microalgae. *C. vulgaris* has been studied as a potential producer of biodiesel because of the ability to produce and accumulate lipids in cells. Studies on the growth and lipid production of *C. vulgaris* are largely divided into the following two categories. The studies are an analytical study of an effect of different culture conditions (light intensity, pH, aeration, salinity, and temperature) and a study of the concentration of $CO_2$ as a substrate. In particular, when the supply of $CO_2$ is increased, intracellular acetyl-CoA levels and lipid accumulation increase by 2.6% $CO_2$. Depending on a dissolved inorganic carbon (DIC) resource, the productivity of biomass may increase by 27% and the productivity of biodiesel may increase by 7.7% under a 5% $CO_2$ condition optimized for the growth and lipid accumulation of *C. vulgaris*.

Carbonic anhydrase (CA) is an enzyme that easily converts $CO_2$ into bicarbonate by animals, plants, and microorganisms. Most of studies on carbonic anhydrase are related to the structure of carbonic anhydrase, and it has been reported that some carbonic anhydrases form dimers or tetramers to increase enzyme activity or thermal stability. A major limitation in the industrial use of carbonic anhydrase is that the enzyme is unstable when equipment for capturing $CO_2$ is placed in a poor environment. To overcome these limitations, various attempts have been made to add disulfide bonds, induce direct evolution in harsh environments, modify surface residues of a hydrogen carbonate enzyme, or use enzyme immobilization techniques and whole cell strategies. However, studies of increasing the growth and lipid production of microalgae by directly using the hydrogen carbonate enzyme have not yet been reported.

"4th generation biofuels" are improved in carbon capture and storage (CCS) technology of 3rd generation biofuels, and a biotechnology was grafted thereto with a keyword "algae to biofuels". Photosynthetic bacteria or microalgae have been used as promising microorganisms for the production of the 4th generation biofuels, and recent studies have improved the carbon capture and storage technology (CCS) capabilities of the bacteria through nutrient medium compositions, culture conditions, metabolic engineering, genetic engineering, or enzymatic engineering.

Accordingly, the present inventors completed the present disclosure by studying a method for forming a carbonic anhydrase (CA) complex so as to increase the growth and lipid production of green algae by improving $CO_2$ fixation.

PRIOR ARTS

Non-Patent Document

Kang, D. H., You, S. K., Joo, Y. C., Shin, S. K., Hyeon, J. E., Han, S. O. (2018). Synergistic effect of the enzyme complexes comprising agarase, carrageenase and neoagarobiose hydrolase on degradation of the red algae. Bioresour Technol, 250, 666-672.

Liu, X., Sadhukhan, S., Sun, S., Wagner, G. R., Hirschey, M. D., Qi, L., Lin, H., Locasale, J. W. (2015). High-Resolution Metabolomics with Acyl-CoA Profiling Reveals Widespread Remodeling in Response to Diet. Mol Cell Proteomics, 14(6), 1489-500.

You, S. K., Joo, Y. C., Kang, D. H., Shin, S. K., Hyeon, J. E., Woo, H. M., Um, Y, Park, C., Han, S. O. (2017). Enhancing Fatty Acid Production of Saccharomyces cerevisiae as an Animal Feed Supplement. J Agric Food Chem, 65(50), 11029-11035.

DISCLOSURE

Technical Problem

A technical object to be achieved by the present disclosure is to provide a carbonic anhydrase complex, and a composition for promoting a carbon dioxide fixation reaction and/or a composition for promoting lipid production of green algae including the carbonic anhydrase complex.

Another object of the present disclosure is to provide a method for preparing the carbonic anhydrase complex.

Yet another object of the present disclosure is to provide a carbon dioxide fixation method and/or a culture method for increasing the lipid productivity of green algae using the carbonic anhydrase complex.

However, technical objects of the present disclosure are not limited to the aforementioned purpose, and other objects which are not mentioned may be clearly understood to those skilled in the art from the following description.

Technical Solution

In order to solve the problem, the present disclosure provides a carbonic anhydrase complex in which a conjugate of a carbonic anhydrase and a dockerin module is bound to a small cellulose binding protein including a cohesin module and a cellulose binding module (CBM).

The present disclosure also provides a composition for promoting a carbon dioxide fixation reaction and/or a composition for promoting lipid production of green algae including the carbonic anhydrase complex.

The present disclosure also provides a method for preparing a carbonic anhydrase complex including the following steps:

(1) a first transformant preparing step of transfecting a vector including a gene encoding a carbonic anhydrase and a gene encoding a dockerin module;

(2) a second transformant preparing step of transfecting a vector including a gene encoding a cohesin module and a gene encoding a cellulose binding module; and (3) a third step of culturing the first and second transformants in each medium.

In an example embodiment of the present disclosure, the carbonic anhydrase complex may be prepared by mixing a culture of the first transformant and a culture of the second transformant at a mole fraction of 2:1.

In another example embodiment of the present disclosure, the gene encoding the carbonic anhydrase of step (1) may include a nucleotide sequence of SEQ ID NO: 1 or a gene consisting of the same.

In another example embodiment of the present disclosure, the gene encoding the dockerin module of step (1) may include a nucleotide sequence of SEQ ID NO: 2 or a gene consisting of the same.

In another example embodiment of the present disclosure, the gene encoding the cohesin module of step (2) may include a nucleotide sequence of SEQ ID NO: 3 or a gene consisting of the same.

In another example embodiment of the present disclosure, the gene encoding the cellulose binding module of step (2) may include a nucleotide sequence of SEQ ID NO: 4 or a gene consisting of the same.

In yet another example embodiment of the present disclosure, in the preparing method, the transformant into which a vector is injected and used as a host cell may be *Escherichia coli.*

In yet another example embodiment of the present disclosure, the vector of steps (1) and (2) is not limited as long as the vector is actively expressed in the host cell, but may preferably be a pColdII plasmid vector.

The present disclosure also provides a carbon dioxide fixation method including the following steps of:

(1) preparing the carbonic anhydrase complex of claims 1; and (2) supplying carbon dioxide to the prepared carbonic anhydrase complex to convert the carbon dioxide into bicarbonate.

The present disclosure also provides a culture method for increasing lipid productivity of green algae, including treating the carbonic anhydrase complex of claim 1 to green algae. The lipid may preferably be fatty acids, more preferably unsaturated fatty acids.

Advantageous Effects

The present disclosure relates to a carbonic anhydrase complex and method of manufacturing thereof, in which a conjugate of a carbonic anhydrase and a dockerin module is bound to a small cellulose binding protein including a cohesin module and a cellulose binding module (CBM). The carbonic anhydrase complex, which includes a cellulose binding module, is immobilized on the surface of green algae, to increase access to a substrate and enzyme activity, thereby efficiently fixing carbon dioxide, and increasing the growth and lipid production of green algae without adding other carbon sources. The present disclosure is expected to be actively utilized in fields, such as biofuels, using carbon dioxide fixation.

MODES OF THE INVENTION

Figure 1:
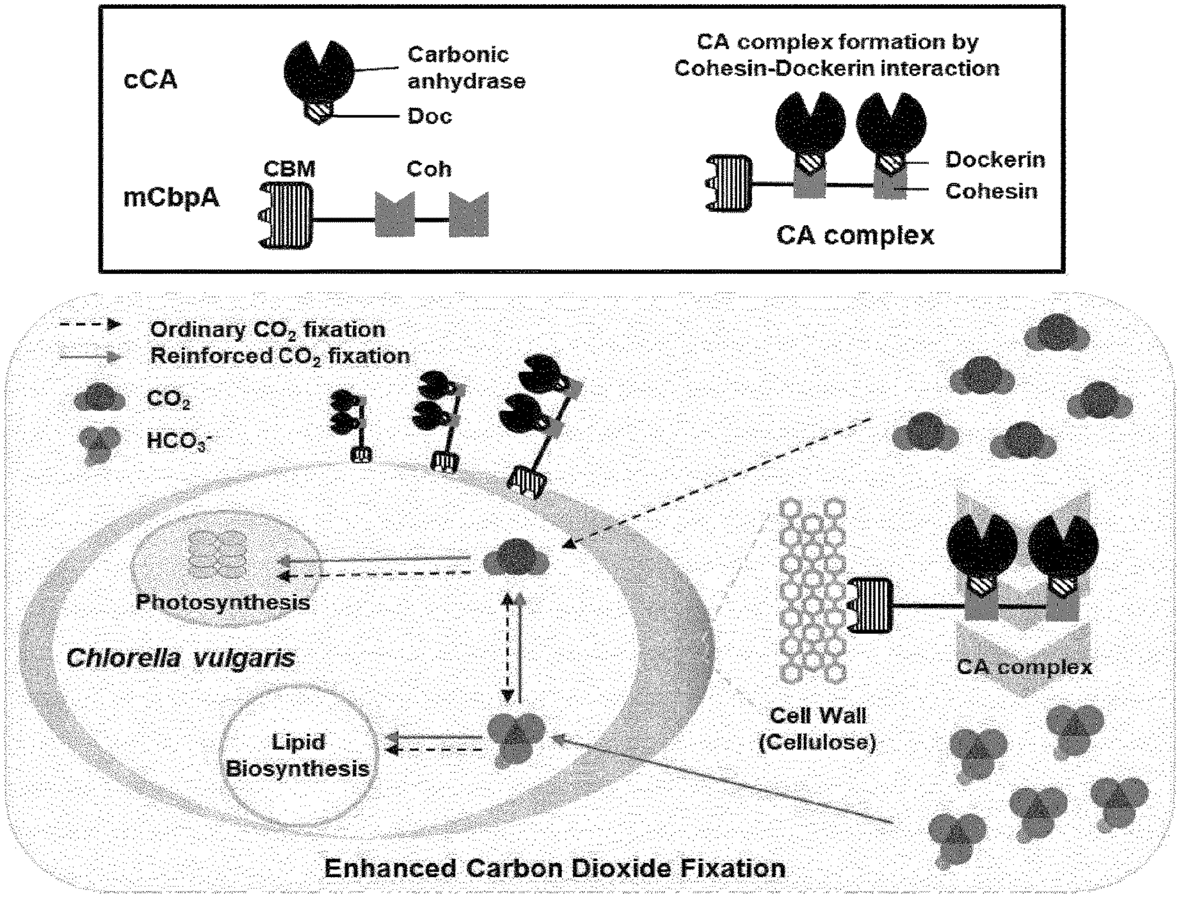
FIG. 1 is schematically illustrating a method for immobilizing a CA complex on the surface of green algae (*C. vulgaris*) and a strategy for increasing the growth and lipid production of green algae (*C. vulgaris*) through the method. (CBM: cellulose binding module, mCbpA: small cellulose binding protein A, Coh: cohesin, Doc: dockerin, CA: carbonic anhydrase)

The present inventors studied a technology for stably and efficiently fixing carbon dioxide in green algae, confirmed through specific experiments that when carbonic anhydrase was complexed to be immobilized on the surface of green algae, the activity and stability of carbonic anhydrase were increased and the access to a substrate was increased, thereby increasing the fixation amount of carbon dioxide and increasing the cell growth and lipid production of green algae, and then completed the present disclosure.

Therefore, the present disclosure provides a carbonic anhydrase complex in which a conjugate of a carbonic anhydrase and a dockerin module is bound to a small cellulose binding protein including a cohesin module and a cellulose binding module (CBM).

In the present disclosure, the "carbonic anhydrase (CA)" is also referred to as carbonic anhydrous enzyme, and is a metalloenzyme that catalyzes a hydration reaction of carbon dioxide to produce bicarbonate ($HCO_3^-$) as a result of the hydration reaction. In the present disclosure, a carbonic anhydrase gene used a hmCA gene (SEQ ID NO: 1) derived from a *Hydrogenovibrio marinus* strain encoding an α-carbonic anhydrase, but may use a gene having 80% homology, preferably 85% homology, more preferably 90% homology, and most preferably 95% homology with a nucleotide sequence of the gene by considering the degeneracy of a DNA sequence or genetic code.

In the present disclosure, the term "bicarbonate" means an inorganic component containing a bicarbonate group ($HCO_3^-$), and the term may include bicarbonate, a bicarbonate ion, or a mixture of bicarbonate and carbonate. The term "carbonate" means an inorganic component containing a carbonate group ($CO_3^{2-}$), and the term may include a carbonate, a carbonate ion, or a mixture of bicarbonate and carbonate.

In the present disclosure, the "dockerin" is a core protein for complexing the carbonic anhydrase, and used a dockerin gene (SEQ ID NO: 2) derived from a *Clostridium* strain, more specifically *C. cellulovorans*, but may use a gene having 80% homology, preferably 85% homology, more preferably 90% homology, and most preferably 95% homology with a nucleotide sequence of the gene by considering the degeneracy of a DNA sequence or genetic code.

In the present disclosure, the "cohesin" is a core protein of scaffoldin that interacts with dockerin to allow carbonic anhydrase to form a complex and function to be bound with a cellulose binding protein, and may use a cohesin gene (SEQ ID NO: 3) derived from a *Clostridium* strain, more specifically *C. cellulovorans*, but may use a gene having 80% homology, preferably 85% homology, more preferably 90% homology, and most preferably 95% homology with a nucleotide sequence of the gene by considering the degeneracy of a DNA sequence or genetic code.

On the other hand, the present disclosure provides a small functional complex by mimicking a cellulosome in order to efficiently and stably fix carbon dioxide, and the complex includes a cellulose binding module (CBM), and is expressed in a state immobilized on the surface of the cell wall of green algae to increase the activity and stability of the carbonic anhydrase. The cellulose binding module used a gene (SEQ ID NO: 4) derived from a *Clostridium* strain, more specifically *C. cellulovorans*, but may use a gene having 80% homology, preferably 85% homology, more preferably 90% homology, and most preferably 95% homology with a nucleotide sequence of the gene by considering the degeneracy of a DNA sequence or genetic code.

In the present disclosure, the "vector" uses a pColdII plasmid, but is not limited thereto as long as the vector is a DNA construct containing a DNA sequence operably linked to a suitable regulatory sequence capable of expressing DNA in a suitable host. Thus, the vector may be a plasmid, a phage particle, or simply, a potential genomic insert. When transformed into an appropriate host, the vector can replicate and function independently of a host genome, or can be integrated into the genome itself in some cases. Since the plasmid is the most commonly used form of the current vector and a form used in a specific embodiment of the present disclosure, the "plasmid" and the "vector" of the present disclosure are sometimes used interchangeably. However, the present disclosure includes other forms of vectors that have equivalent functions which have been known or are to be known in the art.

As used herein, the term "recombinant expression vector" is generally a recombinant carrier into which a heterologous DNA fragment is inserted, and generally refers to a double-stranded DNA fragment. Here, the heterologous DNA refers to heteromorphous DNA, which is DNA not found naturally in a host cell. When the expression vector is once present in the host cell, the expression vector may replicate independently of host chromosomal DNA and several copies of the vector and its inserted (heterologous) DNA may be produced.

The vector may include a promoter operatively linked to a gene to be cloned, and in the present disclosure, the "promoter" promotes the expression of a gene to be transfected, and the promoter may further include not only a basic element necessary for transcription, but also an enhancer that may be used to promote and regulate the expression.

In addition, in the present disclosure, the "transformation" or "transfection" means that DNA is introduced into a host so that the DNA is an extrachromosomal factor or replicable by chromosomal integration completion.

The present disclosure may have various modifications and various example embodiments, and specific example embodiments will be illustrated in the drawings and described in detail in the detailed description. However, this does not limit the present disclosure within specific example embodiments, and it should be understood that the present disclosure covers all the modifications, equivalents and replacements within the idea and technical scope of the present disclosure. In describing the present disclosure, if it is determined that a detailed description of a related known art may obscure the point of the present disclosure, then the detailed description thereof will be omitted.

Example Embodiment 1. Formation of Carbonic Anhydrase Complex (CA Complex)

*Escherichia coli* DH5a (Invitrogen, USA) was used as a host cell for manipulating DNA, and pColdII (Takara, Japan) and pET-22b (+) (Novagen, USA) were used as expression vectors. An *E. coli* BL21 (DE3) strain (Invitrogen, USA) was used for the production of an enzyme protein. As a photosynthetic microorganism, *C. vulgaris* UTEX 265 was used.

In the present disclosure, an hmCA gene (SEQ ID NO: 1) of *Hydrogenovibrio marinus* was used to form a functional complex of mimicking a cellulosome for efficiently and stably fixing $CO_2$. In order to form an enzyme complex subunit, the hmCA gene was fused with a dockering domain of cellulosomal cellulase EngB and docB (SEQ ID NO: 2) of a *Clostridium cellulovorans* enzyme complex to form a single enzyme (cCA) by a multiplex PCR method. The gene was inserted into the expression vector using a restriction enzymes and a T4 DNA ligase (NEB, UK).

Meanwhile, the amount of cellulose in the cell wall varied depending on the species of microalgae, and it was known that the amount of cellulose in seaweed was 1 to 20%, whereas the amount of cellulose in filamentous green algae was 20 to 45%. In particular, the cell wall of *C. vulgaris* was mostly composed of 70 to 80% cellulose. The present disclosure used an mCbpA pET22b (+) plasmid developed in a previous study (Kang et al., 2018) in order to express the small cellulose binding protein (mCbpA) of *C. cellulovorans*. The protein included a cellulose binding module (CBM) and two cohesins, and the CBM allows the CA complex to be expressed in a form immobilized on the surface of *C. vulgaris*.

The recombined cCA and mCbpA were purified by a Ni-NTA resin column and mixed at a mole fraction of 2:1. The CA complex was formed through cohesin-dockerin interaction in a calcium chloride binding buffer (FIG. 1).

Example Embodiment 2. Culture of Green Algae (*C. vulgaris*)

*C. vulgaris* was cultured in a 500 mL flask using a 100 mL volume of bold basal medium (BBM), and the culture was started at OD 540=0.1. *C. vulgaris* was cultured at 120 rpm at 28° C. for up to 7 days, and the growth of *C. vulgaris* was measured daily. $CO_2$ was used with 5% syngas and was supplied to a headspace of the flask during culturing.

Example Embodiment 3. Confirmation of Surface Immobilization of CA Complex

In order to confirm surface immobilization of the complex by CBM, confocal fluorescence microscopy analysis was performed using a green fluorescent protein (GFP). In order to form a complex through cohesin-dockerin interaction, GFP of Aequorea Victoria was fused with dockerin (GFP-doc). *C. vulgaris* samples were cultured at 28° C. for 7 days, mCbpA and GFP-doc were expressed in *E. coli* and purified with His tag, and then the formed complex was mixed with the cultured *C. vulgaris* and cultured for 1 hour. After washing, surface immobilization was analyzed using a confocal laser-scanning microscope, and a LSM 5 Exciter (Carl-Zeiss, Oberkochen, Germany).

Figure 2:
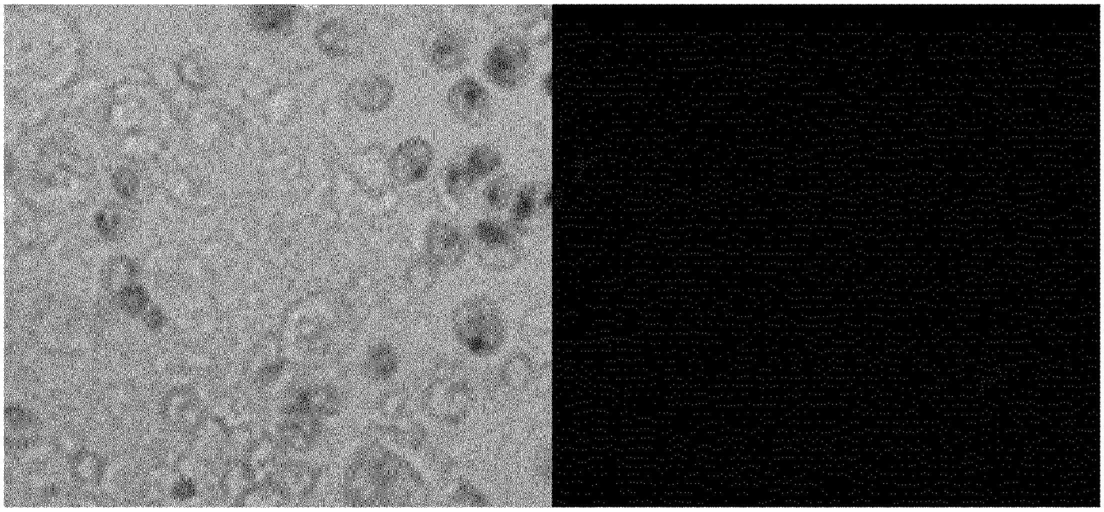
FIG. 2 is a confocal fluorescence micrograph for confirming the surface immobilization of the CA complex, which compares (A) a control group treated with GFP-doc and (B) an experimental group treated with GFP-doc-mCbpA. The left shows an image of cells in mCbpA containing CBM, and the right shows an image of green fluorescent probes on the surface of the same cells, which have been detected by phase contrast.
Figure 2:
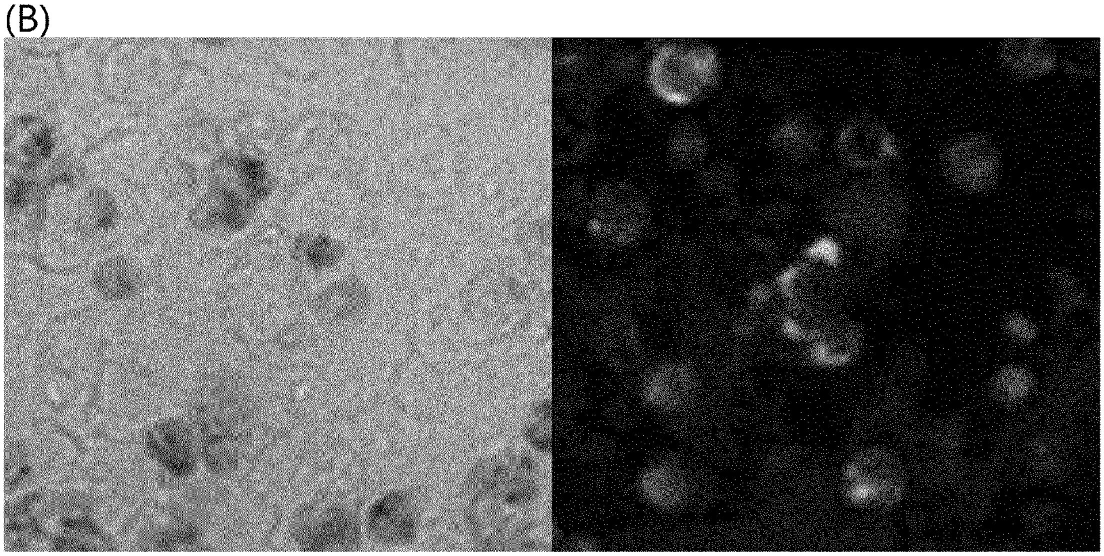

As a result, the enzyme immobilization could not be observed on the surface of *C. vulgaris* after washing in a control group without mCbpA. However, in the complex group bound to GFP mCbpA, the enzyme immobilization was successfully observed on the surface of *C. vulgaris* by CBM (FIG. 2).

Example Embodiment 4. Activity and Stability of Carbonic Anhydrase Complex

In order to analyze an effect of the formation of the CA complex on the activity and stability of carbonic anhydrase, the esterase activity was tested using p-nitrophenyl acetate (p-NPA).

First, 30 μL of 30 mM pNPA, 240 μL of 20 mM Tris-sulfate buffer (pH 7.5) and 30 μL of the prepared enzyme were added to a 96-well plate. The esterase activity was measured at 25° C. with a spectrophotometer. Absorbance was analyzed at a wavelength of 405 nm for 3 minutes.

Figure 3:
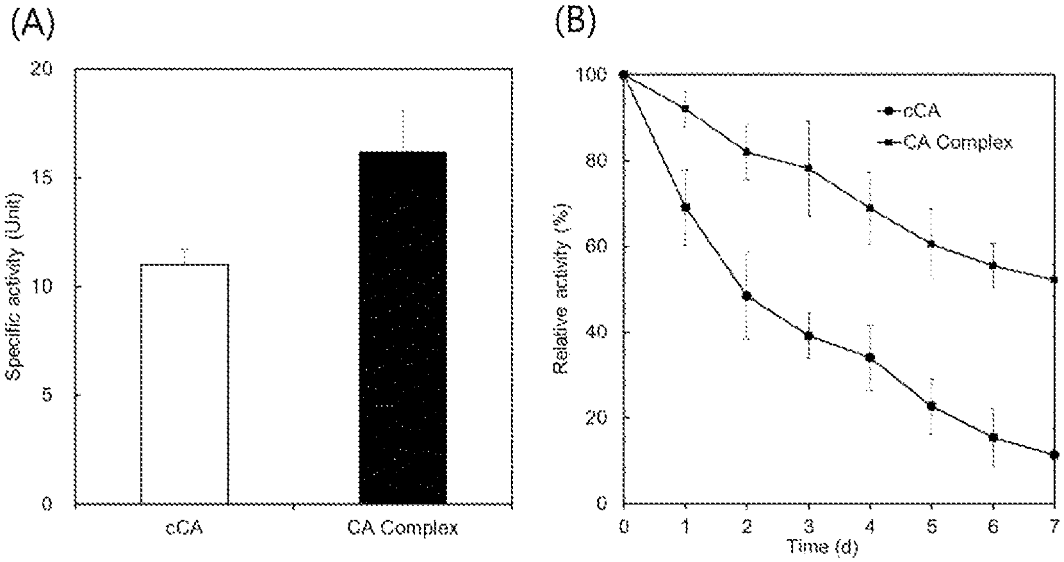
FIG. 3 illustrates an effect of the formation of the CA complex on the carbonic anhydrase activity. (A) of FIG. 3 illustrates a comparison of relative enzyme activity levels of the CA complex and a single enzyme (cCA), and (B) of FIG. 3 illustrates a comparison of the stability of the CA complex and the single enzyme (cCA).

Under the same conditions, as a result of p-NPA esterase activity analysis, the activity of the carbonic anhydrase complex was about 1.4 times higher than that of a single enzyme ((A) of FIG. 3).

The stability of the enzyme was analyzed after successfully forming the CA complex through the cohesin-dockerin interaction. The enzyme activity was measured for 7 days, and the activity of the single enzyme (cCA) was lower than 50% on day 2 and about 11% on day 7 compared to a reference value. However, the activity of the CA complex was about 82% of the reference value on day 2 and about 52% of the reference value on day 7 ((B) of FIG. 3). The results show that the activity of the carbonic anhydrase is stably maintained by the structure of the CA complex. Meanwhile, when the carbonic anhydrase is formed as a dimer or tetramer, the enzyme activity, the stability, or the thermal stability may be increased due to intramolecular disulfide binding and non-covalent binding interactions and the like.

Example Embodiment 5. Growth of *C. vulgaris* According to Treatment of Carbonic Anhydrase Complex Understanding a correlation between dissolved inorganic carbon (DIC) and the growth of microalgae is an important part of increasing the efficiency of $CO_2$ fixation. A carbon source is a major component of the biomass of microalgae, and DIC produced by the supplied $CO_2$ is only a carbon source for microalgae. The present inventors expected that the CA complex would increase the DIC concentration by rapidly converting $CO_2$ into bicarbonate ($HCO_3^-$) and lead to rapid growth of *C. vulgaris*. After *C. vulgaris* was cultured for 7 days or more, absorbance (optical density, O.D.) was measured at 540 nm.

Figure 4:
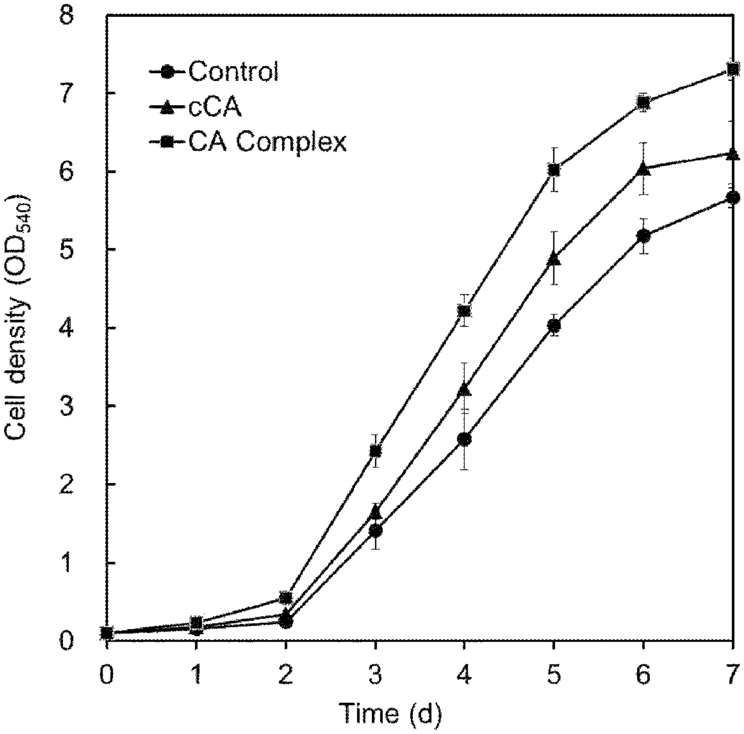
FIG. 4 illustrates an effect of the CA complex on cell growth. For a cell density, an optical density (OD) was measured at a wavelength of 540 nm.

In the presence of the CA complex, *C. vulgaris* showed more rapid growth than a control group. During 3 to 5 days corresponding to the middle of a log phase, the O.D. of *C. vulgaris* treated with the CA complex was approximately 1.6 times higher than that of the control group, which indicated rapid growth. At day 7 of culture, the difference in O.D. was about 1.3 times, which was considered because a stationary phase was imminent (FIG. 4). The supplied $CO_2$ was dissolved in a medium and converted to DIC such as $CO_2$ (aq), bicarbonate, and carbonate. The DIC is directly affected by a temperature, pH, and a concentration of other salts of the dissolved aqueous solution. *C. vulgaris* intracellular transports DIC to use DIC as a carbon source, and the growth rate varies depending on a concentration of supplied $CO_2$. Meanwhile, the adding of sodium bicarbonate ($NaHCO_3$) to the present disclosure may inhibit the early growth of *C. vulgaris*. Moreover, since the DIC is changed and the growth is inhibited as the pH is increased, there may be a limit to the addition of additional carbon sources.

Example Embodiment 6. Lipid Production and Fatty Acid Content According to Treatment of Carbonic Anhydrase Complex To confirm that the CA complex increased DIC, the concentration of malonyl-CoA was analyzed using HPLC. The malonyl-CoA was an important metabolite corresponding to the initiation of fatty acid biosynthetic pathways, and in a rate-limiting step of fatty acid biosynthesis, the malonyl-CoA was produced by reacting acetyl-CoA and bicarbonate by acetyl-CoA carboxylase.

The concentration of the malonyl-CoA was measured using a high performance liquid chromatography (HPLC) system (Waters Corporation USA) consisting of a binary HPLC pump (Waters 1525), an automatic sample injector (Waters 717) and a dual λ absorbance detector (Waters 2487). SUPELCOSIL LC-18-DB HPLC column L×I.D. 250×4.6 mm, 5 μm particle size (Supelco Inc., USA) was used with mobile phase A: water with 5 mM ammonium acetate (pH 6.8) and mobile phase B: methanol. A detailed linear gradient was performed with reference to a previous study (Liu et al., 2015).

Figure 5:
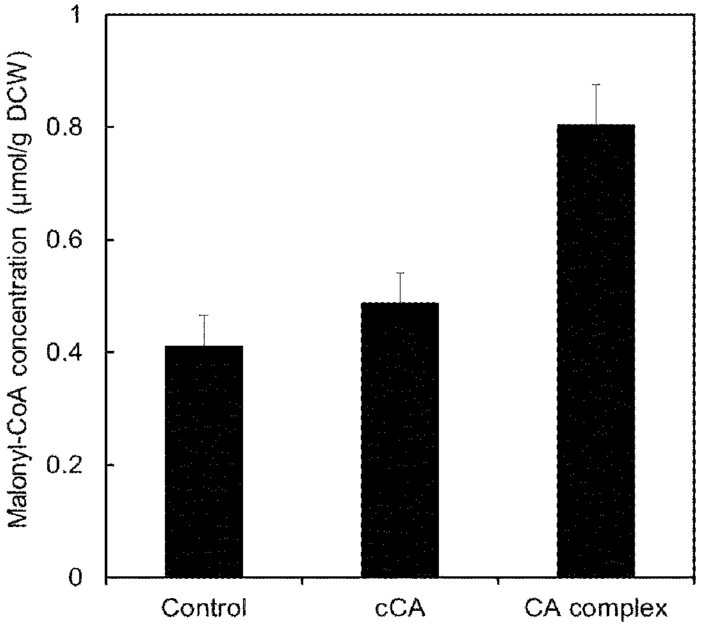
FIG. 5 illustrates an analysis of an effect of the CA complex on the intracellular concentration of malonyl-CoA in *C. vulgaris* by HPLC.

Compared with a control group, malonyl-CoA was 2.0 times higher in a CA complex treatment group. As a result, the present inventors confirmed that lipid biosynthesis was activated under the effect of the CA complex (FIG. 5).

Increased malonyl-CoA promoted overall lipid metabolism. To compare a change in lipid content according to an increase of the bicarbonate level, lipids were extracted using chloroform and analyzed by a dry weight method, and the measured values were compared daily. More specifically, cells were centrifuged at 12000 rpm for 1 minute at 4° C. and a supernatant was removed. The centrifuged cells were completely dried in a drying oven at 55° C. and weighed with a balance. Lipids were extracted by a Folch's method using a chloroform methanol (2:1, v/v) solvent mixture. The extracted lipids were dried and weighed, and the lipid content was calculated using a weight difference.

Figure 6:
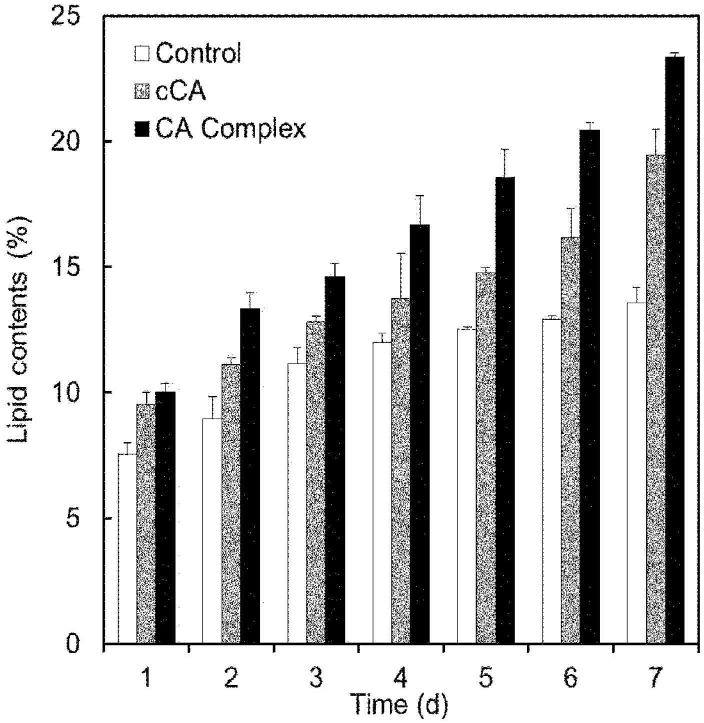
FIG. 6 illustrates results of analysis of the lipid content of *C. vulgaris*, in which the lipids were extracted using chloroform, and analyzed by a dry weight method.

On day 7, the highest lipid content of the CA complex was 23.3%, which was 1.7 times higher than that of the control group of 13.6% (FIG. 6). The growth and lipid production of *C. vulgaris* were determined by how much $CO_2$ was efficiently supplied into the cells. When the amount of supplied $CO_2$ was increased, it was confirmed that both the growth and lipid production increased. However, if the supply of $CO_2$ was consistently high, the pH decreased and the growth was inhibited. The experiment was performed by adding sodium bicarbonate ($NaHCO_3$) to prevent the pH from being decreased by the high concentration of $CO_2$ and to increase the carbon supplied to the cells.

To confirm the effect of DIC increased by the CA complex on the fatty acid content, the fatty acid content on day 7 was analyzed by gas chromatography (GC). The sample was pulverized by a Folch's method and derivatized with FAME. The derivatized FAME was analyzed using Agilent's GC 7890 with FID, and an HP-5MS column (30 m, 2.5 mm inner diameter, 0.25 mm film) was used. The conditions of GC-FID were performed with reference to a previous study (You et al., 2017).

Figure 7:
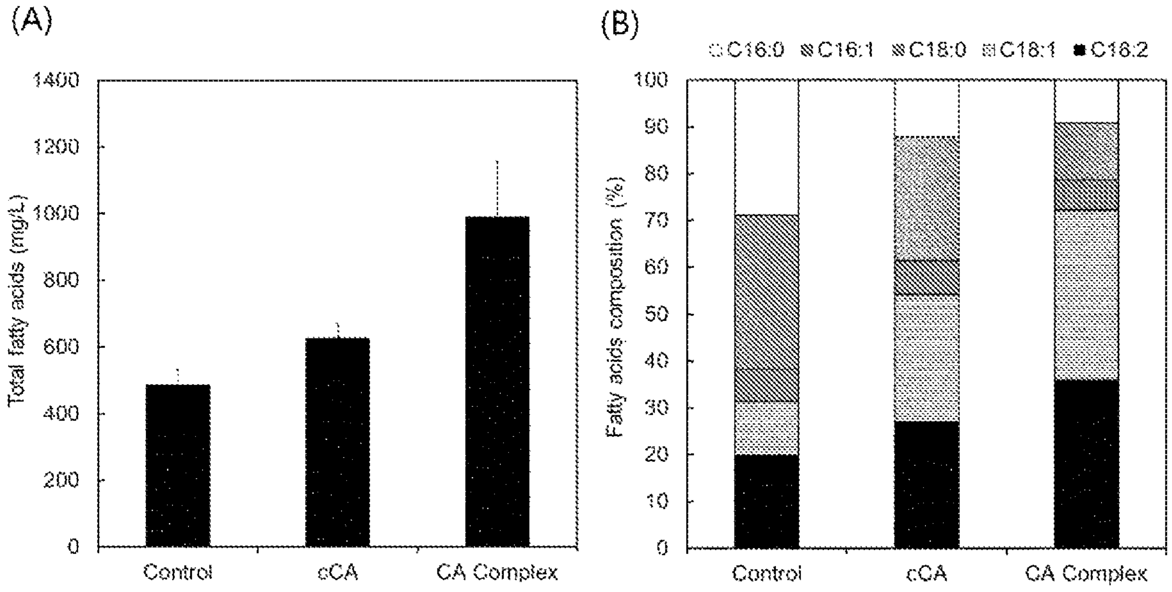
FIG. 7 illustrates results of analyzing the fatty acid production and content by gas chromatography (GC), in which (A) of FIG. 7 illustrates the total fatty acid production, and (B) of FIG. 7 illustrates the total fatty acid content.

In the CA complex treated group, the amount of total fatty acids was 989.4 mg/L, which was twice higher than that of the control group (containing 485.4 mg/L of total fatty acids) ((A) of FIG. 7). The fatty acid content was analyzed from C16:0 to C18:2. Interestingly, under the effect of the CA complex, the content of saturated fatty acids decreased from 35.8% to 15.6%, and the content of unsaturated fatty acids increased from 64.2% to 84.4% ((B) of FIG. 7).

Meanwhile, the content of fatty acids may vary depending on a type of carbon source present in a culture medium of *C. vulgaris*. When ammonium bicarbonate ($NaHCO_3$) was added or photosynthesis was performed in a nitrogen-deficient state, the content of saturated fatty acids was increased. The results suggest that when *C. vulgaris* is cultured with the CA complex, $CO_2$ is more efficiently fixed, and various unsaturated fatty acids produced through this can be utilized later.

As described above, specific parts of the present disclosure have been described in detail, and it will be apparent to those skilled in the art that these specific techniques are merely preferred embodiments, and the scope of the present disclosure is not limited thereto. Therefore, the substantial scope of the present disclosure will be defined by the appended claims and their equivalents.

The invention claimed is:

1. A carbonic anhydrase complex, wherein a conjugate of a carbonic anhydrase encoded by a gene of SEQ ID NO: 1 and a dockerin module encoded by a gene of SEQ ID NO: 2 is bound to a small cellulose binding protein including a cohesin module protein encoded by a gene of SEQ ID NO: 3 and a cellulose binding module (CBM) encoded by a gene of SEQ ID NO: 4.

2. A composition for promoting a carbon dioxide fixation reaction comprising the carbonic anhydrase complex of claim 1.

3. A composition for promoting lipid production of green algae comprising the carbonic anhydrase complex of claim 1.

4. A method for preparing a carbonic anhydrase complex comprising the following steps:

(1) a first transformant preparing step of transfecting a vector comprising a gene of SEQ ID NO: 1 encoding a carbonic anhydrase and a gene of SEQ ID NO: 2 encoding a dockerin module;

(2) a second transformant preparing step of transfecting a vector comprising a gene of SEQ ID NO: 3 encoding a cohesin module and a gene of SEQ ID NO: 4 encoding a cellulose binding module; and (3) a third step of culturing the first and second transformants in each medium.

5. The method for preparing the carbonic anhydrase complex of claim 4, wherein the carbonic anhydrase complex is prepared by mixing a culture of the first transformant and a culture of the second transformant at a mole fraction of 2:1.

6. The method for preparing the carbonic anhydrase complex of claim 4, wherein the transformant of steps (1) and (2) is *Escherichia coli.*

7. The method for preparing the carbonic anhydrase complex of claim 4, wherein the vector of steps (1) and (2) is a pColdII plasmid vector.

8. A carbon dioxide fixation method comprising the following steps of:

(1) preparing the carbonic anhydrase complex of claim 1; and (2) supplying carbon dioxide to the prepared carbonic anhydrase complex to convert the carbon dioxide into bicarbonate.

9. A culture method for increasing lipid productivity of green algae, comprising treating the carbonic anhydrase complex of claim 1 to green algae.

* * * * *

SEQUENCE LISTING

<160> NUMBER OF SEQ ID NOS: 4

<210> SEQ ID NO 1
<211> LENGTH: 918
<212> TYPE: DNA
<213> ORGANISM: Hydrogenovibrio marinus

<400> SEQUENCE: 1
catatgcaac atagcaatgc cccattgatt gacttgggcg cggaaatgaa aaaacagcac 60
aaggaggcag ctcccgaagg cgctgcgccg gctcaaggta aggcacctgc cgcggaagcc 120
aaaaaagaag aagcacctaa accaaaaccc gttgtgcata acccacattg gtcttattcg 180
ggagaagaag gccccgacca ttggggagac ttgtcgcctg attatgcaac ctgtaaaacc 240
ggcaaaaatc agtcaccaat taacttgatg gcagatgatg ccgttggcac cacttcacta 300
ccgggctttg atgtgcacta ccgtgatacg gttcttaaag tcatcaacaa cggccacacg 360
ctgcaagcca acgtgccttt gggtagctat atcaaaatca aaaatcagcg ttatgagctg 420
ttgcagtatc attttcatac cccctcagaa catcagttga acggtttcaa ttatccgatg 480
gagttgcatt tggttcaccg agatggtcgt gggcattatc tggtaattgg tattttgttc 540
agagagggta aagagaacga tgcgttgcaa actatcctga accacttgcc taaaaaagtc 600
ggtaaacagg aaatttttaa tggcattgaa tttaatccaa atgtcttttt ccctgaaagt 660
aaaaaattct ttaaatacag cggctcttta accacaccgc cttgtacgga aggggtttat 720
tggatggtgt tcaaacaacc aatcgaagcg tcggcggagc aacttgaaaa gatgaacgaa 780
ttaatggggg cgaatgctcg tcctgttcag gatttggaag ctcgctcgtt gttgaaatct 840
tggagcaatc ctaaaaacga tagtcaggat caccgttact atcaatatta cctcgagcac 900

-continued caccaccacc accactga 918

<210> SEQ ID NO 2
<211> LENGTH: 159
<212> TYPE: DNA
<213> ORGANISM: Clostridium cellulovorans

<400> SEQUENCE: 2
gatgttaaca aagatggaaa ggtaaatgct atcgattatg cagtgcttaa atcaattctt 60
ttaggtacaa atactaacgt tgatttatca gtatcagaca tgaataagga tggtaaagta 120
aatgctttgg atttagctgt tcttaaaaaa atgcttttta 159

<210> SEQ ID NO 3
<211> LENGTH: 407
<212> TYPE: DNA
<213> ORGANISM: Clostridium cellulovorans

<400> SEQUENCE: 3
gtaacagcta caattggaaa agtacaagta aatgctggag aaacggtagc agtaccagtt 60
aacttaacaa aagttccagc agctggttta gcaacaattg aattaccatt aacttttgat 120
tctgcatcat tagaagtagt atcaataact gctggagata tcgtattaaa tccatcagta 180
aacttctctt ctacagtaag tggaagcaca ataaaattat tattcttaga tgatacatta 240
ggaagccaat taatcataag gatggagttt ttgcaacaat aacatttaaa gcaaaagcta 300
taactggaac aactgcaaaa gtaacttcag ttaaattagc tggaacacca gtagttggtg 360
atgcgcaatt acaagaaaaa ccttgtgcag ttaacccagg aacagta 407

<210> SEQ ID NO 4
<211> LENGTH: 1647
<212> TYPE: DNA
<213> ORGANISM: Clostridium cellulovorans

<400> SEQUENCE: 4
gcagcgacat catcaatgtc agttgaattt tacaactcta acaaatcagc acaaacaaac 60
tcaattacac caataatcaa aattactaac acatctgaca gtgatttaaa tttaaatgac 120
gtaaaagtta gatattatta cacaagtgat ggtacacaag gacaaacttt ctggtgtgac 180
catgctggtg cattattagg aaatagctat gttgataaca ctagcaaagt gacagcaaac 240
ttcgttaaag aaacagcaag cccaacatca acctatgata catatgttga atttggattt 300
gcaagcggag cagctactct taaaaaagga caatttataa ctattcaagg aagaataaca 360
aaatcagact ggtcaaacta cactcaaaca aatgactatt catttgatgc aagtagttca 420
acaccagttg taaatccaaa agttacagga tatataggtg gagctaaagt acttggtaca 480
gcaccaggtc cagatgtacc atcttcaata attaatccta cttctgcaac atttgataaa 540
aatgtaacta aacaagcaga tgttaaaact actatgactt taaatggtaa cacatttaaa 600
acaattacag atgcaaacgg tacagctcta aatgcaagca ctgattatag tgtttctgga 660
aatgatgtaa caataagcaa agcttattta gcaaaacaat cagtaggaac aactacatta 720
aactttaact ttagtgcagg aaatcctcaa aaattagtaa ttacagtagt tgacacacca 780
gttgaagctg taacagctac aattggaaaa gtacaagtaa atgctggaga aacggtagca 840
gtaccagtta acttaacaaa agttccagca gctggtttag caacaattga attaccatta 900
acttttgatt ctgcatcatt agaagtagta tcaataactg ctggagatat cgtattaaat 960
ccatcagtaa acttctcttc tacagtaagt ggaagcacaa taaaattatt attcttagat 1020

-continued

```
gatacattag gaagccaatt aatcactaag gatggagttt ttgcaacaat aacatttaaa   1080

gcaaaagcta taactggaac aactgcaaaa gtaacttcag ttaaattagc tggaacacca   1140

gtagttggtg atgcgcaatt acaagaaaaa ccttgtgcag ttaacccagg aacagtaact   1200

atcaatccaa tcgataatag aatgcaaatt tcagttggaa cagcaacagt aaaagctgga   1260

gaaatagcag cagtgccagt aacattaaca agtgttccat caactggaat agcaactgct   1320

gaagcacaag taagttttga tgcaacatta ttagaagtag catcagtaac tgctggagat   1380

atcgtattaa atccaacagt aaacttctct tatacagtaa acggaaatgt aataaaatta   1440

ttattcctag atgatacatt aggaagccaa ttaattagta aagatggagt ttttgtaaca   1500

ataaacttca aagcaaaagc tgtaacaagc acagtaacaa caccagttac agtatcagga   1560

acacctgtat ttgcagatgg tacattagca gaagtacaat ctaaaacagc agcaggtagc   1620

gttacaataa atattggaga tcctata                                       1647
```